(No Model.) 2 Sheets—Sheet 1.
F. F. RAYMOND, 2d.
NAIL FEEDING IMPLEMENT.
No. 405,598. Patented June 18, 1889.
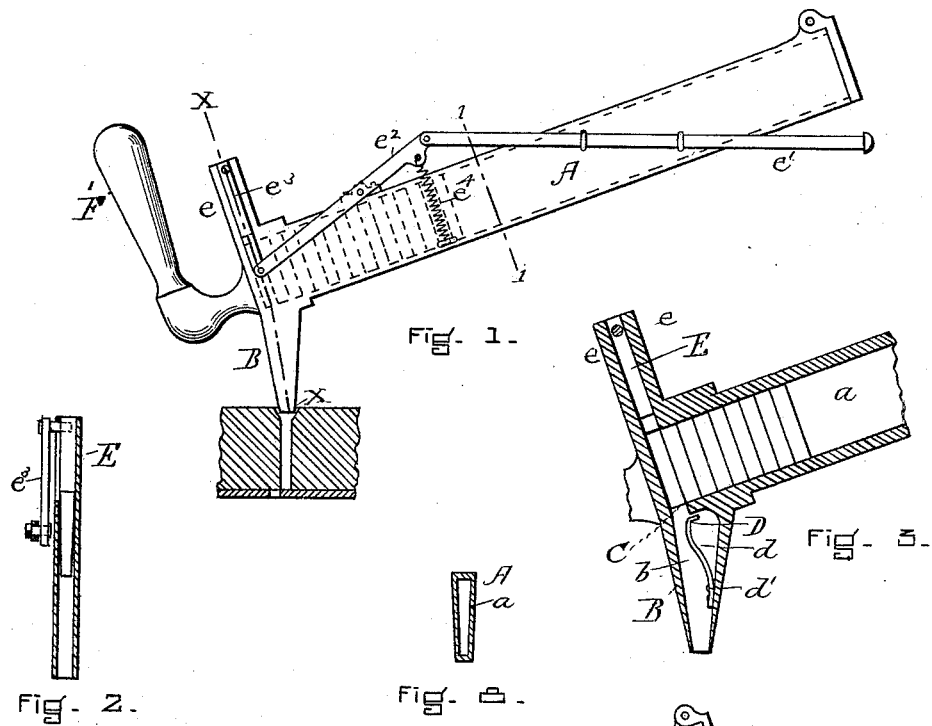
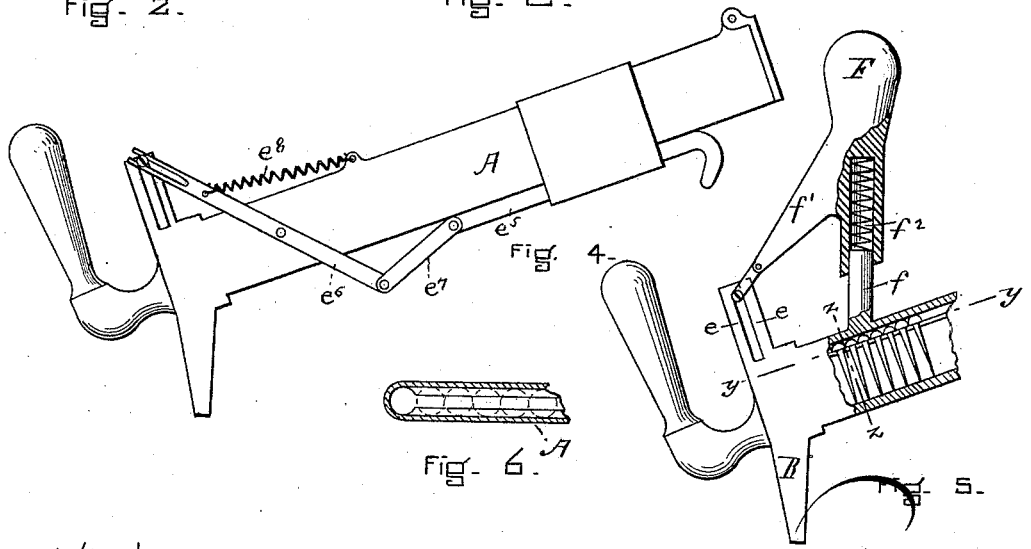
WITNESSES.
J. M. Dolan
Fred. B. Dolan
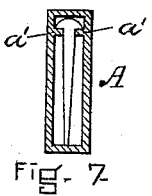
INVENTOR.
F. F. Raymond (No Model.) 2 Sheets—Sheet 2.

F. F. RAYMOND, 2d.
NAIL FEEDING IMPLEMENT.

No. 405,598. Patented June 18, 1889.

WITNESSES
Fred. B. Dolan
J. B. Gardner

INVENTOR
F. F. Raymond

UNITED STATES PATENT OFFICE.

FREEBORN F. RAYMOND, 2D, OF NEWTON, MASSACHUSETTS.

NAIL-FEEDING IMPLEMENT.

SPECIFICATION forming part of Letters Patent No. 405,598, dated June 18, 1889.

Application filed May 15, 1885. Serial No. 165,573. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Portable Nail-Feeding Devices, of which the following is a full, clear, and exact description, reference being had to the accompanying drawings, forming a part of this specification, in explaining its nature.

The object of the invention is to provide means whereby nails or other similar fastenings may be fed by hand to a nail-holder, carrier, perforated heel, or other similar device or thing.

While machines have been patented for distributing loose nails which so far as I am aware have not gone into general use, this invention comprises, in substance, a nail carrier or holder which is arranged to receive and hold a large number of nails in a uniform position—that is, with their heads all in one direction. The device further includes a nail-discharging mechanism or discharger, whereby the nails are discharged or fed from the holder or support one by one, as required. The device further includes a nozzle having a sharp end, whereby its opening can be accurately located, a device for operating the discharger, and a handle for holding the device located in close proximity to the nozzle, so that the device may be rapidly and quickly moved from one hole to another.

Figures 9, 13:
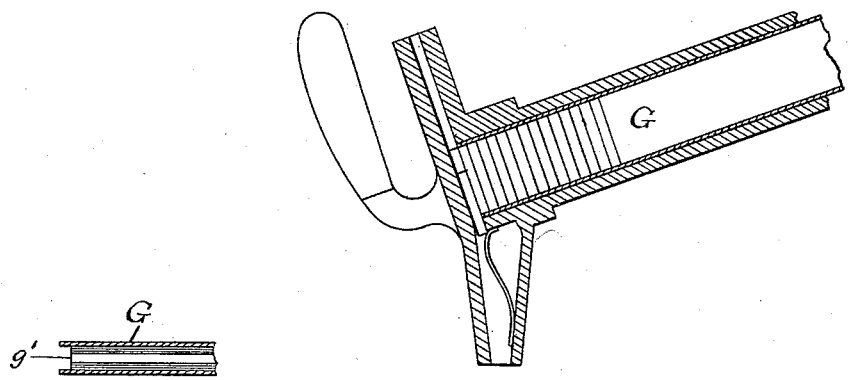
Figure 10:
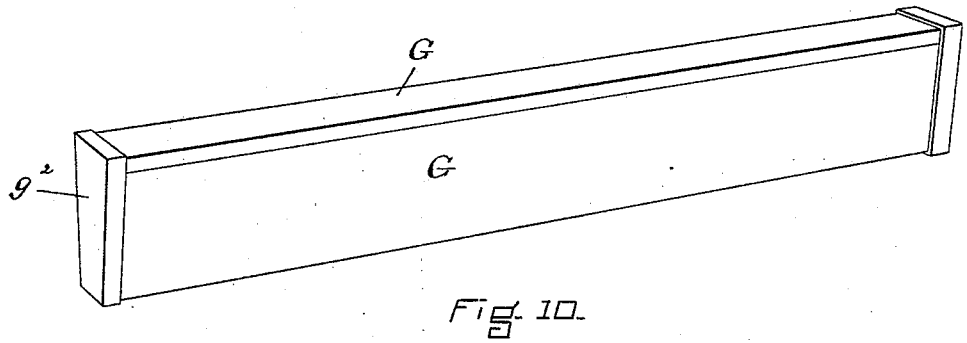
Figure 11:
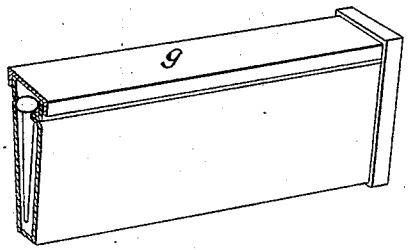
Figure 12:
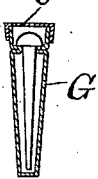

In the drawings, Figure 1 is a side elevation of my improved portable nail-feeding device. Fig. 2 is a vertical section upon the line *x x* of Fig. 1. Fig. 3 is a vertical section of the lower portion of the device at right angles to that shown in Fig. 2 to illustrate various features of the construction. Fig. 4 represents in side elevation a modified form of the device for operating the discharger. Fig. 5 shows still another form for operating it. Fig. 6 is a section upon the line *y y* of Fig. 5. Fig. 7 is a section upon the line *z z* of Fig. 5. Fig. 8 is a section upon the line 11 of Fig. 1. Fig. 9 is a view in vertical section representing the portable nail-feeding device as provided with a removable nail-holding box. Fig. 10 is a view in perspective of the removable box. Fig. 11 is a view in perspective of a portion of a removable box adapted to hold and feed headed nails. Fig. 12 is a view in cross-section of the last-named box.

A represents the nail holder or support, and it preferably is formed of sheet metal and has a cavity *a*, which is substantially V-shaped in cross-section, and from which the nails are fed and in which they are held. If unheaded heel-nails are used, then the nails are arranged therein with their flat sides parallel to each other, as represented in Figs. 1 and 3. If headed nails are used, then I prefer to provide the holder with the head-supporting guides or flanges *a'*, and the holding cavity or recess need not be V-shaped. This holder or carrier I prefer to make somewhat inclined to the nozzle B, so that the nails as they are fed from the holder or carrier, as hereinafter specified, shall by gravity move down the carrier or holder and take the place of those discharged. At the lower end of the holder or carrier there is a passage C of sufficient size to permit the escape of one nail, and it is closed or partially closed so as to prevent the escape of such nail, excepting when it is forced or discharged from the holder or carrier, as hereinafter specified, by a yielding diaphragm or device D, which I have represented in the form of a spring *d*, fastened at *d'*, and the upper portion of which extends beneath, and closes or partially closes said hole. This hole C opens into the hole *b* in the nozzle B, and the hole is arranged to permit of the turning of the nail somewhat, after it leaves the carrier or holder. It will be observed that this hole is tapering, with its widest portion upward, and the lower end or mouth *b'* of the nozzle is made of a size sufficiently large to permit the escape of the nail, but no larger, as it is desirable that the lower end of the nozzle be as small as possible, in order that it may be more accurately located in or over the holes into which the nails are to be discharged.

The discharging device comprises a stripper or plunger E, which is reciprocated vertically across the lower end of the holder or carrier in line with the escape-opening C therein, and when it is not in operation it is held above the nail carrier or holder, so that the lowermost nail in the holder or carrier may occupy a position immediately below it. Its lower end is of course narrower than the width of the nail, in order that it may be brought in contact with but one nail at a time. It is provided with the support $e$, which extends upward from the holder, and which acts also as a guide. This stripper or plunger may be operated in a number of ways, and I have represented it in Fig. 1 as moved by the pushing-rod $e'$, the lever $e^2$, and the link $e^3$, the spring $e^4$ serving to return it and the push-rod to their original positions. In Fig. 4 I have represented it as being operated by a pull $e^5$, the pull being connected with the lever $e^6$ by the link $e^7$, and the spring $e^8$ serves to restore it and the pull to their original positions. In Fig. 5 I have shown it as operated by a downward movement of the handle F, the handle being arranged to slide upon the spindle $f$, and being connected by the arm $f'$ with the stripper or plunger E, so that upon the downward movement of the handle the plunger is operated, and the spring $f^2$ serves to return it and the handle to their original positions.

When the nails are in position, the lowermost nail rests upon the spring-diaphragm immediately beneath the stripper, and upon the movement of the stripper it is forced down past the diaphragm, the stripper or plunger taking its place and preventing the nails immediately above it from following, and the nail, after it passes the yielding diaphragm, drops through the nozzle, and the yielding diaphragm then automatically returns to its normal position, and the plunger or stripper is lifted. The nails then move down, and the next one in order is fed, as before.

To supply the holder or carrier with nails, I attach to a nail sorting or making machine, or any nail sorting or arranging attachment to a nail-driving machine, a long chute adapted to receive the nails one by one and with their heads uppermost, and to hold them for delivery to the holder or carrier of the portable feeding device; or the nails thus arranged may be fed into an auxiliary carrying-box made of pasteboard or other similar material, or metal, and fastened at each end by a cap or in any other suitable way. When such a box or receptacle as this is used, the nails may be assorted or arranged at the factory and packed in the boxes for sale and delivery, and the nails thus packed are either delivered to the nail holder or carrier of the portable feeding device or the box is placed in the feeding device, so that it in substance takes the place of the nail holder or carrier of the device, the nails feeding from it to the nail-discharger just as they feed from the nail holder or carrier. In fact the nail holder or carrier becomes the support for this nail holding and carrying box.

In Figs. 9 to 13, inclusive, I have shown the complete device as provided with a movable or auxiliary nail-carrying box G. This box is shaped to hold the nails in a line, and has an open top which is covered by a cover $g$, and an open end $g'$, which is also adapted to be covered, when not in use, by the cover $g^2$, and through which the nail is fed by gravity to the strip when the box is in position in the feeding device, as represented in Fig. 9.

The principal advantages of this invention arise, first, from the rapidity with which the nails can be fed by hand, and, second, the uniformity with which they are placed, there being substantially no possibility of a nail being fed with the wrong end upward, as quite frequently happens when they are fed by the fingers in the old way.

It will also be observed that the device has a handle F', placed adjacent to its nozzle B, whereby it is easily moved and located. It is desirable that the end of the nozzle be so small and the upper ends of the holes to which the nails are fed so large that the end of the nozzle can be under each hole, as represented in Fig. 3.

In operation the device is held, preferably, by the left hand and operated by the right, and the nozzle is placed over the hole and the stripper operated to move the nail from the nail-holder A into the receiving-hole of the nail carrier, holder, or other article. It is then moved and placed over another hole and a nail fed as before, and so on.

Having thus fully described my invention, I claim and desire to secure by Letters Patent of the United States—

1. The combination, in a portable nail-feeding device, of the nail holder or carrier A, having the hole C, the automatic hole-closing device D, and the reciprocating stripper or plunger E, all substantially as and for the purposes described.

2. The combination, in a portable nail-feeding device, of the nail holder or carrier A, the nozzle B, the reciprocating plunger or stripper E, and the handle F', all substantially as and for the purposes described.

3. The combination, in a portable nail-feeding device, of the nail holder or carrier A, the handle F', the nail stripper or plunger E, and the push-button, knob, or pull for operating the plunger or stripper, all substantially as and for the purposes described.

FREEBORN F. RAYMOND, 2D.

Witnesses:
J. M. DOLAN,
FRED. B. DOLAN.